United States Patent Office.

BERNARD DREYFUSS, OF NEW YORK, N. Y., ASSIGNOR TO ROSA DREYFUSS, OF SAME PLACE.

CEMENT.

SPECIFICATION forming part of Letters Patent No. 491,280, dated February 7, 1893.

Application filed March 7, 1892. Serial No. 424,064. (No specimens.)

*To all whom it may concern:*

Be it known that I, BERNARD DREYFUSS, residing at New York city, in the county and State of New York, have invented certain new and useful Improvements in Cements, of which the following is a full and exact specification.

My invention relates to that class of cements which is generally known as hydraulic cements, and is used in the erection of buildings for the purpose of laying brick, stone or metal. It is well known that the qualities which are desirable in such a cement are—that it may be easily mixed; that it may be easily applied; that it shall have a suitable amount of tenacity; that it shall grow gradually harder, whether exposed to the air or under water; and that it shall finally set or harden to the consistency of a dense stone. Added to these requirements, it is necessary for practical purposes that it shall be cheap. I do not claim that my invention is the first to exhibit any or all these desirable qualities, but I assert that no known cement, exemplifying these qualities in so high a degree, can be procured at so small a cost. I have found that it is possible to utilize for such a cement two substances which have hitherto been generally regarded as refuse and absolutely worthless for any mercantile purpose whatever and entailed great expense for their daily removal from the gas works, on account of their immense bulk. One of these substances is the spent lime which has been used in the process of purifying or de-sulphurizing illuminating gas. This lime, after the gas has been passed through it, is composed of the following ingredients, viz:—silica, oxide of iron, oxide of alumina, lime, magnesia and sulphuric acid ($SO_3$). For convenience of reference I will hereinafter term this composite substance simply "spent lime." The second substance which I combine or mix with the "spent lime" is coke slag which is refuse obtained in the process of making illuminating gas, and has substantially the following compositions, viz:—carbon, silica, oxide of iron, alumina, lime and magnesia. In order to use these two substances in my cement, it is necessary to dry them thoroughly and then pulverize each as finely as possible. The fineness of the powder to which these substances must be reduced is an important point in the practice of my invention. They are then mixed thoroughly while dry and there is then added to the resulting compound a portion of slaked rock-lime, as a binding material. The proportions which I use to attain the best results are as follows:—two parts of spent lime to one part of slag, to which is added about one-twentieth in weight of slaked rock-lime. After these materials are thoroughly mixed they may be packed in barrels and are ready for use at any time; for which they simply require the admixture of sufficient water and sharp sand to produce the consistency of ordinary mortar, so that it may be easily applied with trowels. This cement hardens gradually whether exposed to the air or under water, and within a short time becomes endowed with solid binding force. It will be obvious that differences in the proportions will still produce a cement which is substantially like my invention, and I therefore desire to emphasize the fact that the main point in my invention is the introduction and combination in the same composition, of the spent lime and the coke slag. Some such differences would be naturally made by me to adapt the composition to particular kinds of work. For purposes where a large degree of hardness is desired, the cement may be mixed with more sand or equivalent mineral substance.

Having thus described my invention, what I claim and desire to secure by Letters Patent of the United States is:—

The composition as herein set forth consisting of pulverized spent lime, pulverized carbon, silica, oxide of iron, alumina, lime, and magnesia; and slaked rock-lime, and sand in the described proportions.

BERNARD DREYFUSS.

Witnesses:
W. REUTSCH,
LOUIS E. SALMON.